United States Patent
Iwamura et al.

(10) Patent No.: US 8,189,521 B2
(45) Date of Patent: May 29, 2012

(54) MOBILE STATION, BASE STATION, AND METHOD

(75) Inventors: Mikio Iwamura, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 811 days.

(21) Appl. No.: 12/293,778

(22) PCT Filed: Mar. 19, 2007

(86) PCT No.: PCT/JP2007/055574
§ 371 (c)(1),
(2), (4) Date: Oct. 24, 2008

(87) PCT Pub. No.: WO2007/111185
PCT Pub. Date: Oct. 4, 2007

(65) Prior Publication Data
US 2010/0003979 A1  Jan. 7, 2010

(30) Foreign Application Priority Data
Mar. 20, 2006 (JP) .................................. 2006-077824

(51) Int. Cl.
*H04W 4/00* (2009.01)
(52) U.S. Cl. ........................................ 370/329; 370/232
(58) Field of Classification Search .......... 370/208–209, 370/315–327, 328–338, 232–234, 436–460; 455/436–460, 561
See application file for complete search history.

(56) References Cited

U.S. PATENT DOCUMENTS
2006/0087980 A1  4/2006  Ikeda et al.

2006/0234777 A1 *  10/2006  Vannithamby et al. .... 455/562.1
2008/0101280 A1 *  5/2008  Gholmieh et al. ............ 370/328

FOREIGN PATENT DOCUMENTS

| EP | 1 724 949 | 11/2006 |
|---|---|---|
| JP | 2003-199165 | 7/2003 |
| JP | 2005-064751 | 3/2005 |
| JP | 2005-160079 | 6/2005 |
| JP | 2005-294914 | 10/2005 |
| WO | 2005/034555 | 4/2005 |

(Continued)

OTHER PUBLICATIONS

International Search Report (English & Japanese) for PCT/JP2007/055574 mailed Jun. 26, 2007 (9 pages).

(Continued)

*Primary Examiner* — Pao Sinkantarakorn
*Assistant Examiner* — Iqbal Zaidi
(74) *Attorney, Agent, or Firm* — Osha • Liang LLP (57) ABSTRACT

A disclosed mobile station is designed to send or receive at least a control channel using a given frequency in a first operating mode and to tune to a frequency different from the given frequency and perform a neighboring cell search in a second operating mode. The mobile station includes a measuring unit configured to obtain a measurement of radio channel quality at a measurement interval; and a determining unit configured to compare the measurement and a threshold and to select one of the first operating mode and the second operating mode based on the result of comparison. The mobile station allows a base station to recognize the operating mode of the mobile station either by preventing reporting of the measurement lower than the threshold to the base station or by transmitting a signal indicating the selected operating mode to the base station.

23 Claims, 8 Drawing Sheets

FOREIGN PATENT DOCUMENTS

WO 2005/096523 A1 10/2005

OTHER PUBLICATIONS

Written Opinion of the ISA (Japanese Only) mailed Jun. 26, 2007 (5 pages).

3GPP TS25.214 v6.7.1 (Dec. 2005) 3rd Generation Partnership Project; Technical Specification Group Radio Access Network; "Physical Layer Procedures (FDD)" (60 pages) (Release 6).

3GPP TS25.302 v6.5.0 (Sep. 2005) 3rd Generation Partnership Project; Technical Specification Group Radio Access Network; "Services Provided by the Physical Layer" (75 pages) (Release 6).

3GPP TS25.308 v6.3.0 (Dec. 2004) 3rd Generation Partnership Project; Technical Specification Group Radio Access Network; High Speed Downlink Packet Access (HSDPA); Overall Description; Stage 2 (28 pages) (Release 6).

3GPP TR25.858 v5.0.0 (Mar. 2002) 3rd Generation Partnership Project; Technical Specification Group Radio Access Network; "High Speed Downlink Packet Access: Physical Layer Aspects" (31 pages) (Release 5).

3GPP TR25.813 v0.5.1 (Mar. 2006) 3rd Generation Partnership Project; Technical Specification Group Radio Access Network; "Evolved Universal Terrestrial Radio Access (E-UTRA) and Evolved Universal Terrestrial Radio Access Network (E-UTRAN); Radio interface protocol aspects" (28 pages) (Release 7).

3GPP TS25.331 v6.8.0 (Dec. 2005) 3rd Generation Partnership Project; Technical Specification Group Radio Access Network; "Radio Resource Control (RRC); Protocol Specification" (1174 pages) (Release 6).

\* cited by examiner

MOBILE STATION, BASE STATION, AND METHOD

TECHNICAL FIELD

The present invention generally relates to wireless communication technologies. More particularly, the present invention relates to a mobile station, a base station, and a method.

BACKGROUND ART

In a cellular system, handover is performed along with the movement of a mobile station to switch cells (base stations) to which the mobile station belongs. The handover is performed based on channel quality of neighboring cells measured by the mobile station so that the mobile station is handed over to an appropriate cell. Meanwhile, there is a case where frequency carriers used in the neighboring cells (including the current serving cell) are different from the frequency carrier currently being used by the mobile station for communication (such frequencies are hereafter called different frequencies), or multiple frequency carriers are used in each neighboring cell. Also, there is a case where cells using different wireless access methods (different systems or alternative systems) are present around the mobile station and it is better, in terms of the traffic volume and propagation conditions, to hand over the mobile station to one of such cells to smoothly continue the communications. In such cases, a mobile station is preferably configured to be able to measure channel quality of different frequencies and systems (i.e., to perform a cell search in a system with a different frequency) during communication.

Here, it must be noted that a mobile station with only one receiver cannot tune to multiple frequencies and systems at the same time. This is because the radio frequency (RF) circuit of a receiver cannot tune to multiple frequency carriers and systems at the same time. To be able to measure the channel quality of multiple frequency carriers and systems at the same time, a mobile station must be equipped with multiple receivers (RF circuits). However, this increases sizes, prices, and power consumption of mobile stations. For this reason, many mobile stations currently being used are equipped with one receiver. Such a mobile station measures channel quality of different frequencies and systems during interruptions (may also be called a gap or a gap period) generated by discontinuous reception (DRX) where the current communication is stopped intermittently. In other words, the mobile station stops tuning to a frequency, tunes to a different frequency, and thereby performs a cell search with the different frequency. In this case, if the base station does not know the gaps in DRX, the base station may send signals during the gaps when the mobile station cannot receive signals of the current serving system. This results in waste of precious radio resources as well as causing disadvantageous effects such as an increase in interference power to other communications and an increase in transmission delay. Therefore, the base station has to correctly recognize the DRX status of the mobile station.

In conventional communication systems, DRX is controlled using wireless protocols without taking into account radio channel quality. For example, in W-CDMA, periods (gaps) for measuring the channel quality of different frequencies and systems are provided by starting a compressed mode using a radio resource control (RRC) protocol. Generally, in a compressed mode, a gap is created by transmitting data, which are normally sent using one frame, within a half of the time by doubling the transmission rate. However, in the compressed mode, gaps are created according to a predetermined pattern and therefore the timings of the gaps are determined without taking into account the radio channel quality. Therefore, even if the radio channel quality is good enough to efficiently transmit data, the transmission of data is prohibited if it coincides with the timing of a gap. As a result, the unsent data may have to be transmitted at a timing when the radio channel quality is poor. Thus, with conventional methods, the transmission efficiency may be reduced. The RRC protocol is described, for example, in 3GPP TS25.331 "Radio Resource Control (RRC) Protocol Specification", v6.8.0.

DISCLOSURE OF INVENTION

Problems to be Solved by the Invention

Embodiments of the present invention make it possible to solve or reduce one or more problems caused by the limitations and disadvantages of the background art. One object of the present invention is to improve data transmission efficiency in a wireless communication system where a mobile station operating at a frequency performs discontinuous reception to be able to search for neighboring cells with different frequencies.

Means for Solving the Problems

An embodiment of the present invention provides a mobile station designed to send or receive at least a control channel using a given frequency in a first operating mode and to tune to a frequency different from the given frequency and perform a neighboring cell search in a second operating mode. The mobile station includes a measuring unit configured to obtain a measurement of radio channel quality at a measurement interval; and a determining unit configured to compare the measurement and a threshold and to select one of the first operating mode and the second operating mode based on the result of comparison. The mobile station allows a base station to recognize the operating mode of the mobile station either by preventing reporting of the measurement lower than the threshold to the base station or by transmitting a signal indicating the selected operating mode to the base station.

Advantageous Effect of the Invention

Embodiments of the present invention make it possible to improve data transmission efficiency in a wireless communication system where a mobile station operating at a frequency performs discontinuous reception to be able to search for neighboring cells with different frequencies.

EXPLANATION OF REFERENCES

CQI Radio channel quality indicator
DRX Discontinuous reception

BEST MODE FOR CARRYING OUT THE INVENTION

According to an embodiment of the present invention, a mobile station communicating using a frequency and wireless access method measures instantaneous CQIs at predetermined intervals and compares the instantaneous CQIs with a threshold (e.g., a mean CQI, a correction value of the mean CQI, or a fixed value). If the instantaneous CQI is lower than the threshold, the mobile station creates a gap during which the mobile station does not tune to the frequency and the wireless access method. During the gap, the mobile station tunes to a different frequency and system (different wireless access method), and performs measurements necessary for a neighboring cell search. This configuration makes it possible to efficiently perform measurements of different frequencies and systems while the radio channel quality is poor. Also, this configuration makes it possible to prevent the base station from sending data to the mobile station while the mobile station is measuring a different frequency.

In the above configuration, instantaneous CQIs that are lower than the threshold may not be reported to the base station.

In this case, the base station determines that the mobile station is in a gap if no CQI is reported from the mobile station and refrains from sending data to the mobile station.

Alternatively, the mobile station may be configured to send a signal indicating that a gap is created when the instantaneous CQI is lower than the threshold.

In this case, the base station refrains from sending data to the mobile station if the signal reporting a gap is received.

The instantaneous CQI may be normalized (by calculating the mean value and the variance), and the threshold (e.g., a mean value, a correction value of the mean value, or a fixed value) for determining whether to create a gap may be set for the normalized CQI. Normalizing the instantaneous CQI is preferable in terms of controlling operations of mobile stations.

The threshold and/or the correction value may be reported using a broadcast channel or may be reported separately using control channels.

The threshold and/or the correction value may be adjusted according to the amount of traffic of the base station.

The threshold and/or the correction value may instead be adjusted according to a service being used by the mobile station.

Also, the mobile station may be configured to operate in a regular mode or a measurement mode (irregular mode) and the modes may be switched using a wireless protocol.

The modes may be switched by the mobile station based on radio conditions or load conditions measured by the mobile station.

Alternatively, the modes may be switched by the base station based on radio conditions or load conditions measured by the base station.

Also, the base station may be configured to determine whether to switch the modes based on a CQI reported by the mobile station.

A threshold (threshold A) to enter the measurement mode and a threshold (threshold B) to return to the regular mode may be either the same or different. Using different thresholds is preferable when providing hysteresis for mode switching. For example, when the threshold A is set smaller than the threshold B, the mobile station does not easily enter the measurement mode and at the same time does not easily return to the regular mode.

A gap period may be determined based on a predefined unit gap period (one gap length). A gap period may be properly adjusted by repeating the unit gap period for a necessary number of times. One gap length may be set longer than one frame length or one transmission time interval (TTI), or may be set longer than a CQI report interval. In either case, it is necessary to provide a period of time that is enough for the mobile station to tune to a different frequency and system and to perform measurements. The gap length may be set by a broadcast channel or an individual control channel.

During a gap period, the mobile station is tuned to a different frequency and cannot measure the CQI of the current serving system. Therefore, if the unit gap period is repeated too many times, the number of times CQIs are not reported to the base station may become excessive, and it may become difficult for the base station to properly recognize the status of the mobile station. For this reason, it is preferable to limit the number of consecutive gaps (or a period of time during which CQIs are not reported). The limit on the number of consecutive gaps may be set using a broadcast channel or an individual control channel (using a radio control protocol). The limit may also be changed according to the service being used by the mobile station. When the mobile station uses multiple services, the strictest limit (lowest value) corresponding to the most demanding service may be applied.

Meanwhile, there is a case where a broad system frequency band available for a mobile communication system is divided into many sub-bands and each mobile station uses one or more of the sub-bands for communication. The sub-bands may also be called resource blocks. In such a system, each mobile station measures radio channel quality of each sub-band and reports the measurement (CQI) to the base station. The base station performs time scheduling and frequency scheduling based on CQIs of the sub-bands reported by mobile stations. The base station allocates radio resources (sub-bands and time slots) to mobile stations reporting high CQIs and does not allocate radio resources to mobile stations reporting low CQIs. Therefore, the mobile station does not have to report all measured CQIs of the sub-bands. For example, the mobile station may be configured to select the highest value from multiple CQIs measured for the respective sub-bands and to report only the highest value to the base station. Or, the mobile station may be configured to report a mean value of multiple CQIs to the base station. This approach is preferable in terms of reducing the number of control bits used in the uplink.

First Embodiment

As described above, one object of the present invention is to improve data transmission efficiency in a wireless communication system where a mobile station operating in a frequency performs discontinuous reception to be able to search for neighboring cells with different frequencies.

For this objective, it is preferable to use a mean value of radio channel quality indicators (CQIs) measured by the mobile station (user equipment). The mobile station operates in the regular mode while the mean value is higher than a threshold, and operates in the measurement mode (irregular mode) while the mean value is lower than the threshold. The switch between the regular mode and the measurement mode is performed autonomously by the mobile station based on a switching threshold reported from the base station, for example, as broadcast information. In the regular mode, because propagation conditions are good on average, the mobile station does not measure channel quality of different frequencies and systems, but instead sends or receives control and data channels using the current frequency and the current wireless access method. In the measurement mode, the mobile station creates a gap according to the CQI and measures the channel quality of different frequencies and systems (systems using different wireless access methods) during the gap. More specifically, the mobile station compares the instantaneous CQI and the mean CQI, and if the instantaneous CQI is lower than the mean CQI (i.e., if the instantaneous propagation condition is poor), autonomously creates a gap and measures the channel quality of different frequencies and systems. The base station also performs similar control processes based on CQIs from the mobile station to determine the timings of gaps and refrains from sending data to the mobile station during the gaps. In a system such as HSDPA where scheduling of user packets is performed taking into account CQIs, the probability that radio resources are allocated to a user with a low CQI is low. Therefore, if the mobile station creates gaps when the CQI is low, it may not greatly affect the data transmission performance such as user throughput. The scheduling may be performed using a scheduling scheme such as Max C/I or proportional fairness (PF). Even if radio resources are allocated to the user with a low CQI, the influence of the gaps is still small, because, in a system like HSDPA, adaptive rate control (adaptive modulation and coding (AMC)) is performed based on CQIs.

With the above method, however, because the switch between the regular mode and the measurement mode is performed independently and autonomously by the mobile station and the base station, it is possible that the modes recognized by the mobile station and the base station become different if CQIs are not correctly received by the base station. Also, because the mobile station autonomously controls gaps for the measurement mode, the timings of gaps recognized by the mobile station and the base station may become different. Further, if a gap is simply created when the instantaneous CQI is lower than the mean CQI, it is possible that enough time to measure the channel quality of a different frequency and system is not secured. This is because the receiver of the mobile station has to tune to a different frequency and system before measuring its channel quality and also has to tune again to the current frequency and system after the measurement (e.g., in order to measure the CQI). Thus, because the time for tuning and the time for measurement are necessary, it is difficult to sufficiently measure the channel quality of a different frequency and system if a gap is too short. Although it depends on the use of a product, a gap of 5 ms or longer may be necessary. For this reason, it is preferable to define a unit gap period (one gap length) and to adjust the entire gap period by repeating the unit gap period for a necessary number of times while securing minimum required time. One gap length may be set longer than one frame length or one transmission time interval (TTI), or may be set longer than a CQI report interval.

Meanwhile, CQIs reported by mobile stations are used to perform link adaptation (e.g., transmission power control and AMC) to respond to fast fading. In a wireless system such as HSDPA, CQIs are used for packet scheduling. In HSDPA, CQI refers to $E_c/I_0$ (receiver chip energy to interference power ratio) of a common pilot channel. In the present application, however, CQI broadly refers to indicators of radio channel quality including $E_c/I_0$, propagation loss, received power, and signal to interference power ratio. In a wireless system like HSDPA, packets of users in the same cell are transmitted using common radio resources by time division multiplexing. Scheduling schemes such as Max C/I and Proportional Fairness (PF) compare CQIs reported by multiple users and allocate resources to users with comparatively high CQIs.

Figure 1A:
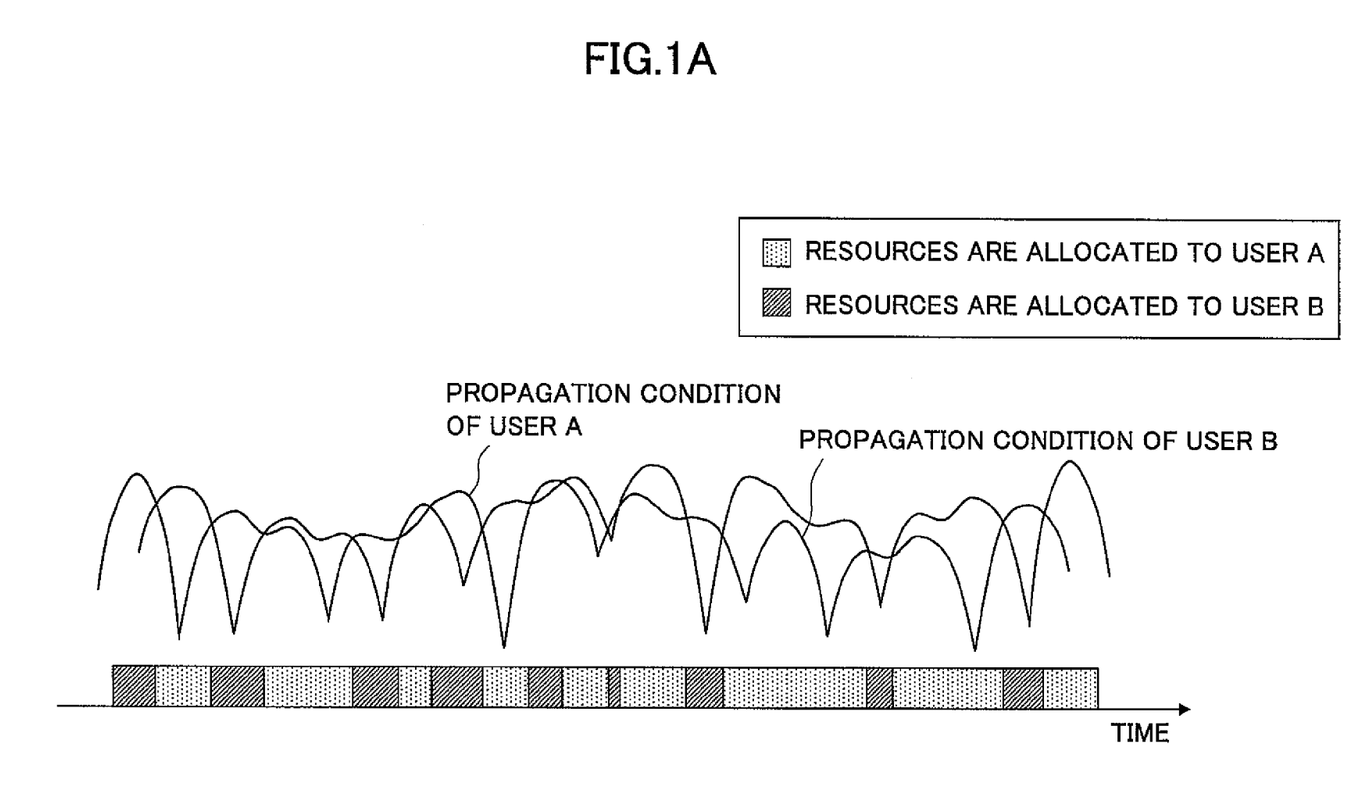
FIG. 1A is a drawing illustrating time scheduling.
Figure 1B:
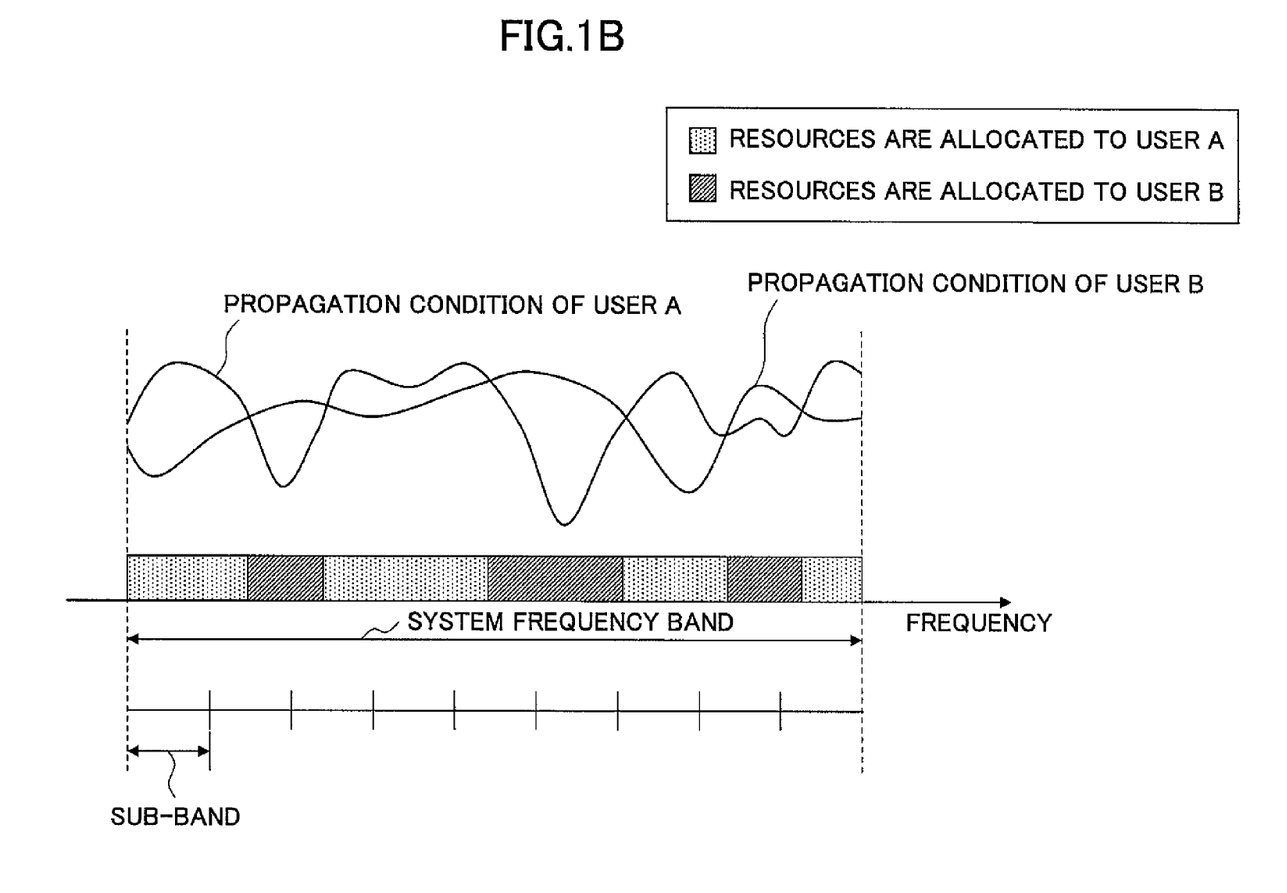
FIG. 1B is a drawing illustrating frequency scheduling.

As shown in FIGS. 1A and 1B, to improve the scheduling efficiency and to increase the multiuser diversity gain, it is necessary for a scheduler to receive enough CQI reports from mobile stations. FIG. 1A shows the profile of a sub-band where time scheduling is performed and CQIs are reported, for example, every 2 ms as in HSDPA. Meanwhile, mobile communication systems are expected to use wider bandwidths to achieve a higher transmission rate, to reduce delay, and to increase transmission capacity. However, using a wide bandwidth may cause frequency selective fading. Therefore, it is preferable to selectively use frequency bands with good quality for the respective users to improve the transmission efficiency. For this purpose, as shown in FIG. 1B, it is necessary to divide the entire system frequency band into multiple sub-bands and to measure and report CQIs for the respective sub-bands. The sub-bands may also be called resource blocks. FIG. 1B shows the profile of a time frame. It must be noted that FIG. 1B is used to describe the general idea of frequency scheduling and does not show accurate proportions of the system frequency band and the sub-bands. Various methods may be used to report CQIs. For example, the mobile station may be configured to report the highest three CQIs and the corresponding sub-bands, to report the difference between a mean value of the entire frequency band and a mean value of each sub-band, or to report a value encoded by discrete cosine transform (DCT) in the frequency direction. In any case, it is necessary to report a sufficient number of CQIs to efficiently use a broad frequency band. On the other hand, frequently reporting CQIs consumes limited radio resources and increases the overhead. Also, frequently reporting CQIs consumes the battery energy of the mobile station quickly and increases uplink interference.

One way to solve these problems is to control mobile stations to refrain from reporting CQIs that are comparatively low. For example, the frequency of reporting CQIs can be reduced by comparing a measured CQI with a threshold (e.g., a mean value of CQIs or a correction value of the mean value) and reporting the measured CQI to the base station only when it is higher than the threshold. In this case, the threshold may be changed according to the amount of traffic. Alternatively, the threshold may be changed based on a transmission scheduling frequency (the frequency at which resources are allocated by a scheduler to a given mobile station) measured by the mobile station. The base station may be configured to refrain from allocating resources to a mobile station while the mobile station is not reporting CQIs, and the mobile station may be configured to create gaps when not reporting CQIs. Even with this configuration, however, it is still possible that gaps are created in succession and as a result, communications are hampered.

An embodiment of the present invention described below can solve or reduce even such problems by limiting the gap period to an appropriate length and thereby makes it possible to improve the transmission efficiency.

Figure 2:
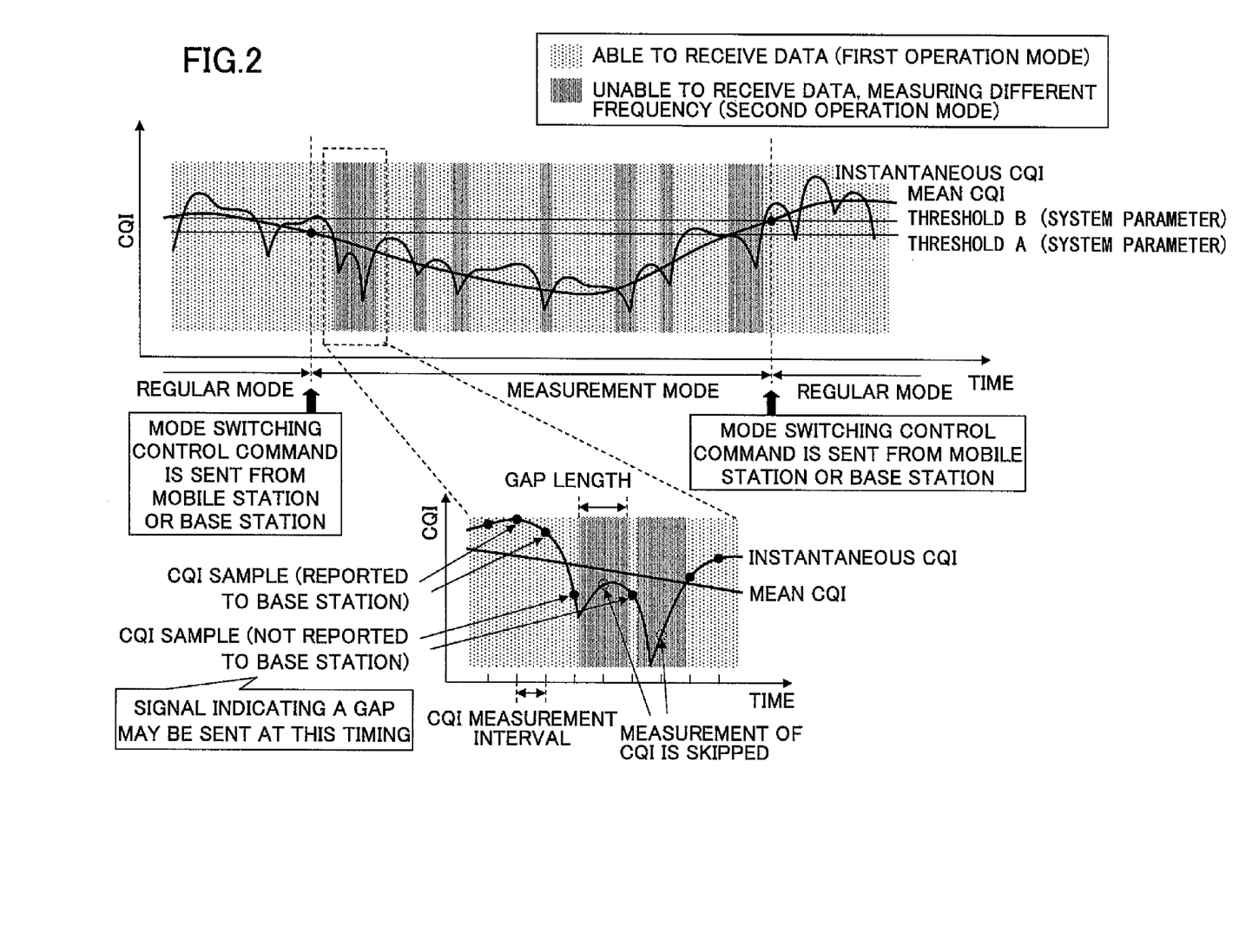
FIG. 2 is a drawing showing relationships between operating modes, instantaneous CQIs, mean CQIs, thresholds, and gaps.

FIG. 2 shows CQIs measured by the mobile station along a time axis. The mobile station measures the reception quality of a downlink pilot channel at intervals to obtain radio channel quality indicators (CQIs). Each measurement is an instantaneous value (instantaneous CQI). A proper number of instantaneous values or instantaneous values during a proper period are averaged to obtain a mean value (mean CQI). When the mean CQI becomes lower than a threshold (system parameter), the mobile station switches from the regular mode to the measurement mode. In the regular mode, the mobile station sends or receives control channels and/or data channels using a given frequency and wireless access method. The mobile station switches to the measurement mode according to the radio channel quality and measures the channel quality of different frequencies and systems. When the mean CQI exceeds the threshold, the mobile station returns to the regular mode. Alternatively, different values may be used for the threshold to switch from the regular mode to the measurement mode and the threshold to switch from the measurement mode to the regular mode. Using different thresholds makes it possible to provide hysteresis for mode switching and thereby makes it possible to improve operational stability. In the measurement mode, the mobile station compares the instantaneous CQI with the mean CQI. While the instantaneous CQI is higher than the mean CQI, the mobile station tunes to the current frequency and system as in the regular mode to be able to receive data. When the instantaneous CQI becomes lower than the mean CQI, the mobile station stops tuning to the current frequency and system, tunes to a different frequency and system (by creating a gap), and measures the channel quality of the different frequency and system.

As shown by the enlarged portion of the measurement mode in FIG. 2, CQIs are measured at predetermined intervals (CQI measurement interval). Each measurement represents an instantaneous CQI. Among the measured instantaneous CQIs, only those higher than the mean CQI are reported to the base station. Because the mobile station tunes to a different frequency and system during the gap, the mobile station does not measure the CQI of the current frequency and system even if the timing to measure the CQI comes. In other words, the base station receives instantaneous CQIs higher than the mean CQI at intervals, but does not receive those lower than the mean CQI. The base station recognizes that the mobile station is not currently tuned to the frequency of the serving cell if instantaneous CQIs are not being reported from the mobile station. In other words, the base station recognizes that the mobile station is in a gap period. Alternatively, to more reliably report the change of the operating mode, the mobile station may be configured to send a signal indicating its operating mode to the base station when an instantaneous CQI not to be reported to the base station is measured. This configuration makes it possible to prevent a problem that the operating modes recognized by the mobile station and the base station become different.

The mobile station enters a gap period after not reporting an instantaneous CQI or after sending a signal indicating its operating mode. Then, the mobile station tunes to a different frequency and system and performs a cell search. After one gap period or a unit gap period (minimum gap period) elapses, the mobile station tunes again to the current system, measures an instantaneous CQI, and compares the measured instantaneous CQI and the mean CQI to determine whether to enter a gap period again. Thereafter, the above steps are repeated. However, if the above steps are simply repeated, the unit gap period may be repeated too many times, the number of times that CQIs are not reported to the base station may become excessive, and as a result, it may become difficult for the base station to properly recognize the status of the mobile station. Also, if the unit gap period is repeated too many times, transmission of data from the base station may be hampered.

For these reasons, it is preferable to limit the number of consecutive gaps (or the number of times that CQIs are not reported in succession). Also, it is possible to place an upper limit on the number of times a signal indicating a gap period can be sent successively to the base station.

In the above descriptions, the regular mode and the measurement mode are switched based on the comparison between a mean CQI and a threshold. Alternatively, modes may be switched based on a mode switching control command issued based on a given protocol. For example, the base station may be configured to issue a mode switching control command when it is better to hand over the mobile station to another frequency and system to improve the load balance and thereby to improve the communication conditions.

Figure 3:
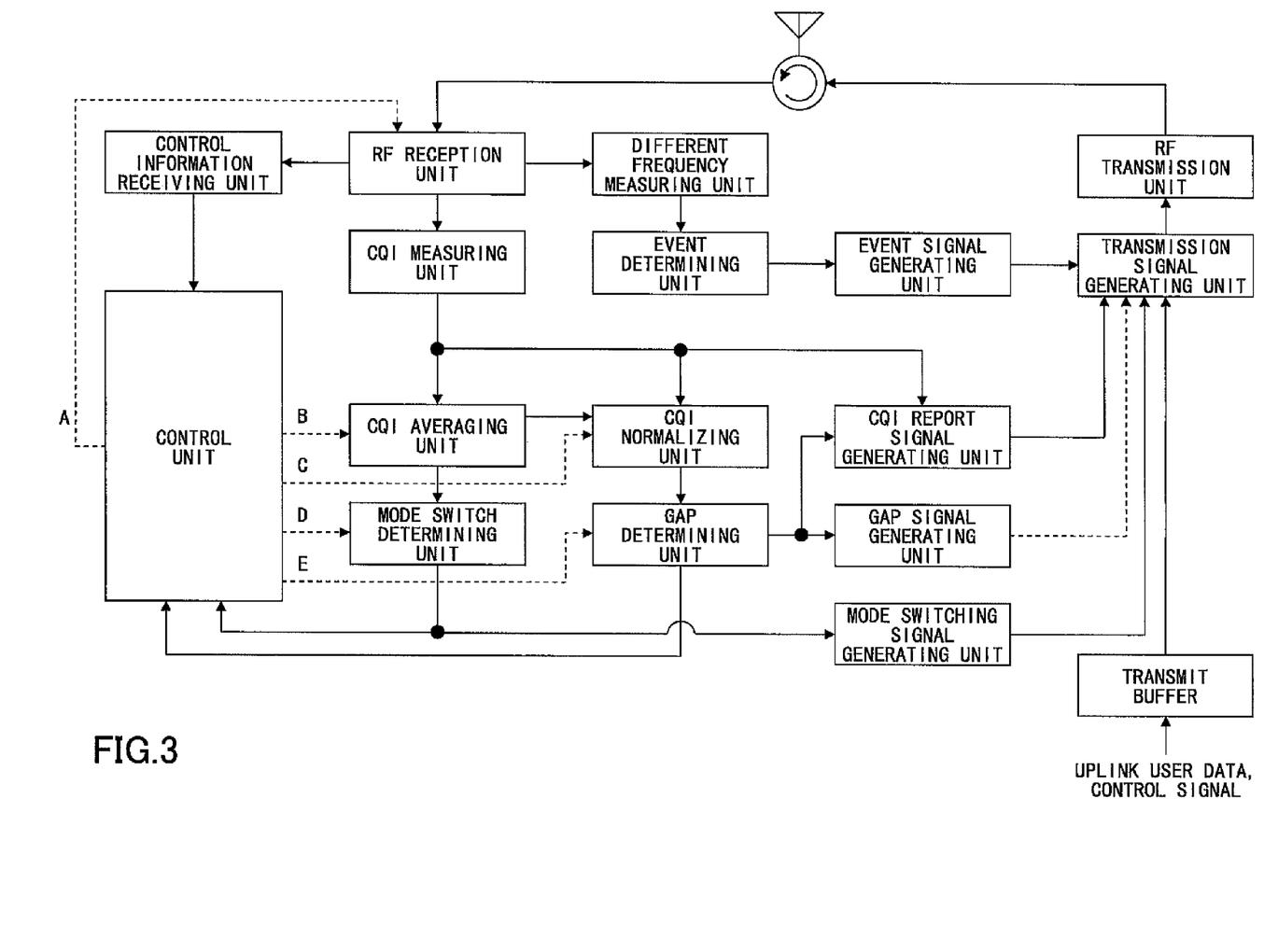
FIG. 3 is a block diagram illustrating a mobile station according to an embodiment of the present invention.

FIG. 3 shows a mobile station according to an embodiment of the present invention. The mobile station shown in FIG. 3 includes an RF reception unit, a CQI measuring unit, a CQI averaging unit, a CQI normalizing unit, a mode switch determining unit, a gap determining unit, a CQI report signal generating unit, a gap signal generating unit, a mode switching signal generating unit, a transmit buffer, a different frequency measuring unit, an event determining unit, an event signal generating unit, a transmission signal generating unit, an RF transmission unit, a control information receiving unit, and a control unit.

The RF reception unit tunes to a frequency and system and receives a signal of the frequency and system. During the regular mode and a non-gap period in the measurement mode, the RF reception unit tunes to the current frequency and wireless access method (current system). During a gap, the RF reception unit tunes to the frequency and wireless access method of a neighboring cell (i.e., a different frequency and system).

The CQI measuring unit measures radio channel quality (instantaneous CQI) based on a received signal (e.g., a common pilot channel) from the serving cell. The CQI may be represented by various indicators such as symbol energy to interference power ratio ($E_s/I_0$). CQIs are measured basically at predetermined intervals except during a gap.

The CQI averaging unit averages instantaneous CQIs. The instantaneous CQIs are thereby smoothed to an extent that it is possible to respond to distance variation and shadowing but not to fast fading.

The CQI normalizing unit normalizes CQIs. The mean CQI calculated by the CQI averaging unit may be used for the normalization. The operation of the CQI normalizing unit may be suspended in the regular mode.

The mode switch determining unit compares the mean CQI obtained by the CQI averaging unit and a threshold set by the control unit and thereby determines whether to switch between the regular mode and the measurement mode.

The gap determining unit evaluates the normalized CQI obtained by the CQI normalizing unit based on conditions set by the control unit and thereby determines whether to create a gap. The operation of the gap determining unit may be suspended in the regular mode. The length of a gap may be controlled to provide enough duration to search for a cell with a different frequency. For example, a gap length may be set longer than the CQI measurement interval or may correspond to the length of one frame. The number of gaps that can be repeated in succession may be limited to prevent a gap period from becoming too long.

The CQI report signal generating unit generates a signal for reporting a CQI. CQIs are not reported during a gap.

The gap signal generating unit generates a gap signal indicating a gap (or a signal indicating an operating mode). The gap signal is, for example, represented by a binary signal with a value 0 or 1. The gap signal generating unit determines the content of the gap signal (or whether to send the gap signal) based on the determination result of the gap determining unit.

The mode switching signal generating unit generates and outputs a mode switch signal indicating the switch between the regular mode and the measurement mode.

The transmit buffer temporarily stores uplink user data, control information, etc.

The different frequency measuring unit tunes to a different frequency and system and performs a cell search with the different frequency and system.

The event determining unit determines whether a specific event has occurred (e.g., the reception level has exceeded a given value) based on the result of measuring the channel quality of the different frequency and system.

The event signal generating unit generates, if an event occurs, a signal for reporting the event.

The transmission signal generating unit generates a transmission signal by multiplexing a CQI signal, a gap signal, a control signal, user data, and so on. Instead, the mobile station may be configured to send a CQI signal, a gap signal, a control signal, and user data as separate physical channel signals or to send a CQI signal and a gap signal by piggy-backing them on a control signal or user data.

The RF transmission unit converts the transmission signal into an RF signal and sends the RF signal.

The control information receiving unit receives control information from the base station.

The control unit controls operations of other components of the mobile station based on the control information output from the control information receiving unit, the determination result output from the mode determining unit, the determination result output from the gap determining unit, the service being used by the mobile station, transmission scheduling frequency, throughput, a packet loss rate, and so on. For example, the control unit performs the following tasks:

A: Controls the RF reception unit to tune to appropriate frequencies and systems. The control unit controls the RF reception unit to tune to a different frequency and system during a gap and to tune to the current frequency and system except during a gap. The control unit switches the modes according to the gap length.

B: Controls parameters for averaging CQIs. For example, the control unit controls parameters for averaging CQIs according to the traveling speed of the mobile station.

C: Controls parameters for normalizing CQIs.

D: Sets a threshold used to determine whether to switch between the regular mode and the measurement mode.

E: Sets a threshold (a fixed value or a correction value of a mean value) used to determine whether to create a gap. The control unit detects consecutive gaps and controls the gap determining unit so that the number of gaps does not exceed a predetermined limit or a limit set by the base station (using a wireless control protocol). Different limits may be used depending on the services being used by mobile stations.

Alternatively, the mode switching may be controlled by the base station. In this case, the mode switch determining unit and the mode switching signal generating unit of the mobile station may not be necessary. In FIG. 3, components such as those for receiving downlink user data are omitted.

Figure 4:
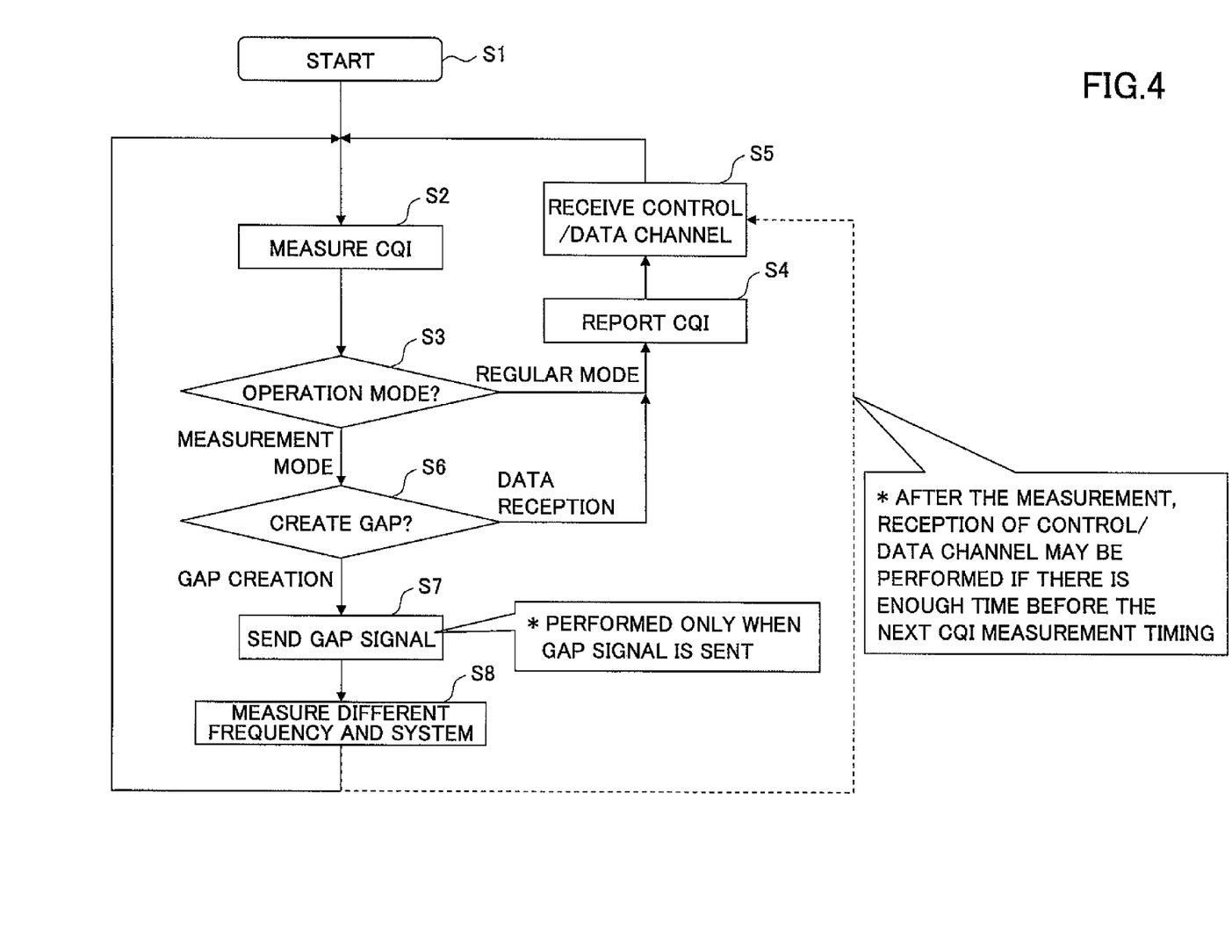
FIG. 4 is a flowchart showing operations of a mobile station.

FIG. 4 is a flowchart showing operations of a mobile station according to an embodiment of the present invention. In step S1, the mobile station is communicating in the regular mode. In step S2, the mobile station receives a downlink common pilot channel and measures the radio channel quality. This step includes measurement of an instantaneous CQI as well as calculation of a mean CQI. In step S3, the mobile station compares the mean CQI with a threshold and determines whether to switch from the regular mode to the measurement mode. If the mean CQI is higher than the threshold, the operating mode is not changed, and the process goes to step S4. In step S4, the mobile station reports the instantaneous CQI to the base station. In step S5, the mobile station sends or receives a control channel and/or a data channel, and the process returns to step S2. Meanwhile, if the mean CQI is equal to or lower than the threshold, the operating mode is switched to the measurement mode, and the process goes to step S6. In step S6, the mobile station compares the instantaneous CQI and the mean CQI and determines whether to create a gap. If the instantaneous CQI is higher than the mean CQI, no gap is created and step S4 is performed as described above. If the instantaneous CQI is equal to or lower than the mean CQI, a gap is created and the process goes to step S7. In step S7, the mobile station generates a gap signal indicating that a gap is created and sends the gap signal to the base station. As described above, the base station can determine that the operating mode has switched based on the fact that the instantaneous CQI is not being reported. Therefore, the signal indicating the operating mode is not absolutely necessary. Still, to reliably report the mode change, it is preferable to use a signal. In step S8, the mobile station stops tuning to the current frequency and wireless access method used in the regular mode and tunes to a different frequency and wireless access method to perform a neighboring cell search. After step S8, the mobile station returns to the regular mode and the process returns to step S2. The mobile station may be configured to proceed to step S5 and receive a control channel and/or a data channel after performing a cell search in a different frequency and system in step S8 if there is enough time before the next CQI measurement timing.

Figure 5:
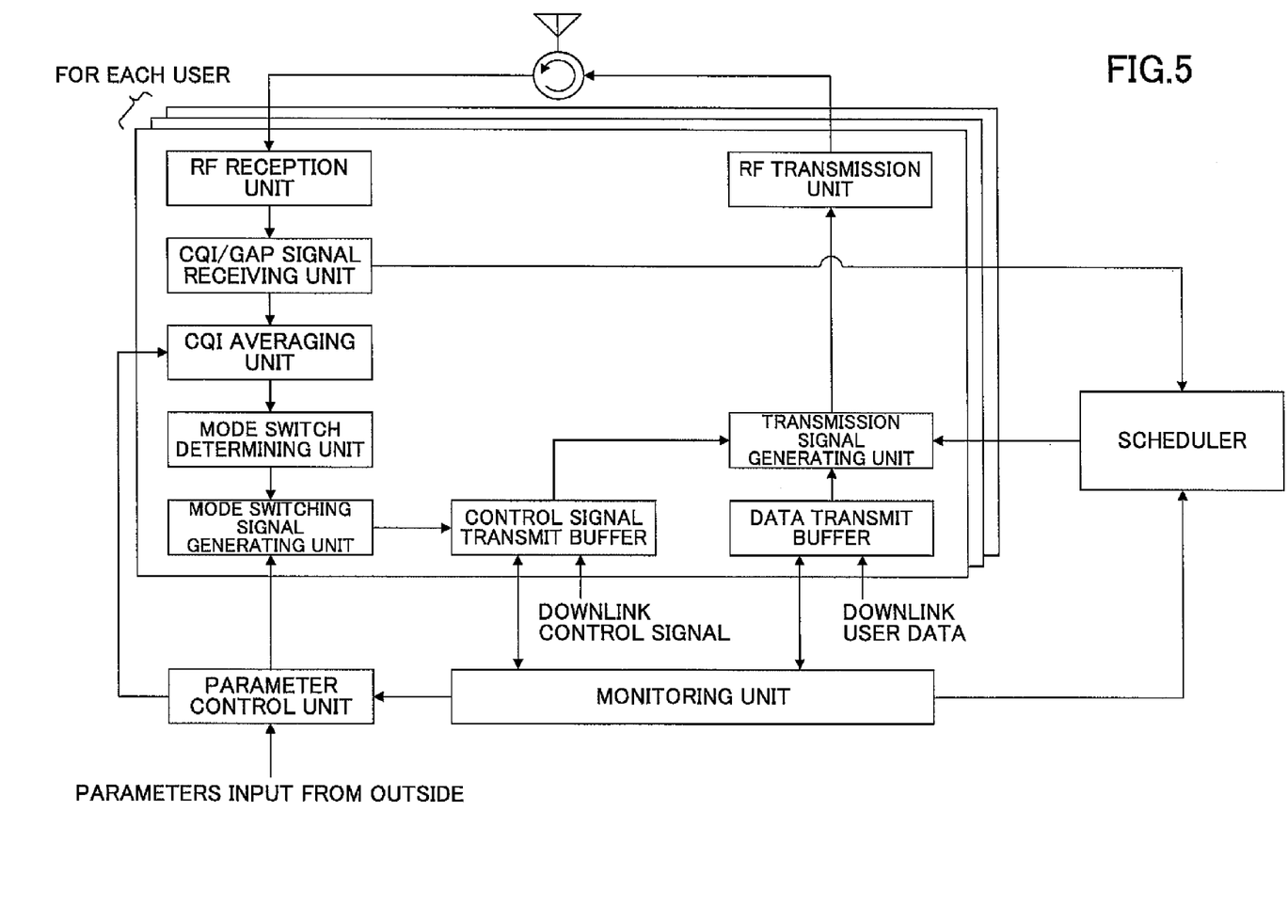
FIG. 5 is a block diagram illustrating a base station according to an embodiment of the present invention.

FIG. 5 shows a base station according to an embodiment of the present invention. The base station shown in FIG. 5 includes an RF reception unit, a CQI/gap signal receiving unit, a CQI averaging unit, a mode switch determining unit, a mode switching signal generating unit, a control signal transmit buffer, a data transmit buffer, a transmission signal generating unit, a scheduler, an RF transmission unit, a monitoring unit, and a parameter control unit. In FIG. 5, components in a frame labeled by "For each user" are provided for each user currently connected. However, for brevity, only one set of the components is shown in FIG. 5.

The RF reception unit tunes to an uplink signal from the mobile station and receives the uplink signal.

The CQI/gap signal receiving unit extracts CQI information and/or gap information from the received signal, and sends the CQI information and/or the gap information to the scheduler.

The CQI averaging unit averages instantaneous CQIs reported by the mobile station.

The mode switch determining unit compares the mean CQI obtained by the CQI averaging unit and a threshold set by the parameter control unit, and thereby determines whether to cause the mobile station to switch between the regular mode and the measurement mode. The mode switch determining unit also compares the instantaneous CQI and the mean CQI to determine whether to cause the mobile station to tune to a different frequency and system.

The mode switching signal generating unit generates and outputs a mode switch signal indicating the switch between the regular mode and the measurement mode based on the determination result of the mode switch determining unit. The generated signal may also include parameters set by the parameter control unit such as a gap length, a CQI averaging/ normalizing parameter, a gap determining threshold or correction value, and a mode switch determining threshold.

The control signal transmit buffer temporarily stores the mode switch signal and other downlink control signals until they are transmitted.

The data transmit buffer temporarily stores downlink user data until they are transmitted.

The transmission signal generating unit generates a transmission signal by multiplexing the downlink control signals and the user data.

The scheduler controls allocation of radio resources taking into account CQIs and gap statuses of mobile stations. The scheduler may also be configured to perform scheduling based on the amount of traffic observed by the monitoring unit, services being used by mobile stations, and priorities of data and control signals.

The RF transmission unit converts the transmission signal into an RF signal and sends the RF signal.

The monitoring unit monitors services being used by mobile stations and uplink and downlink traffic volumes, and sends the monitored results to the parameter control unit and the scheduler.

The parameter control unit sets parameters input from the outside (e.g., by the administrator) and also sets various control parameters based on the monitored results input from the monitoring unit.

When the mode switching is controlled by the mobile station, the mode switch determining unit and the mode switching signal generating unit of the base station may not be necessary. In FIG. 5, components (e.g., for receiving uplink user data) that are not directly related to the present invention are omitted.

Second Embodiment

During a gap period, the mobile station is tuned to a different frequency and system and cannot measure the CQI of the current serving system. Therefore, if the unit gap period is repeated too many times, the number of times CQIs are not reported to the base station may become excessive, and it may become difficult for the base station to properly recognize the status of the mobile station. In addition, when a gap is created to suspend current downlink communications, it often happens that uplink communications are also affected by the gap. This is because a mobile station normally includes only one local oscillator used for both uplink and downlink communications. Accordingly, when the mobile station is tuned to a different frequency and system for downlink communications, it is unable to tune to the current serving system even for uplink communications, and is therefore not able to transmit uplink data. Thus, transmission of uplink data may be delayed. This problem may be fatal for a low-delay service such as voice communication. A second embodiment of the present invention makes it possible to solve or reduce this problem.

Figure 6:
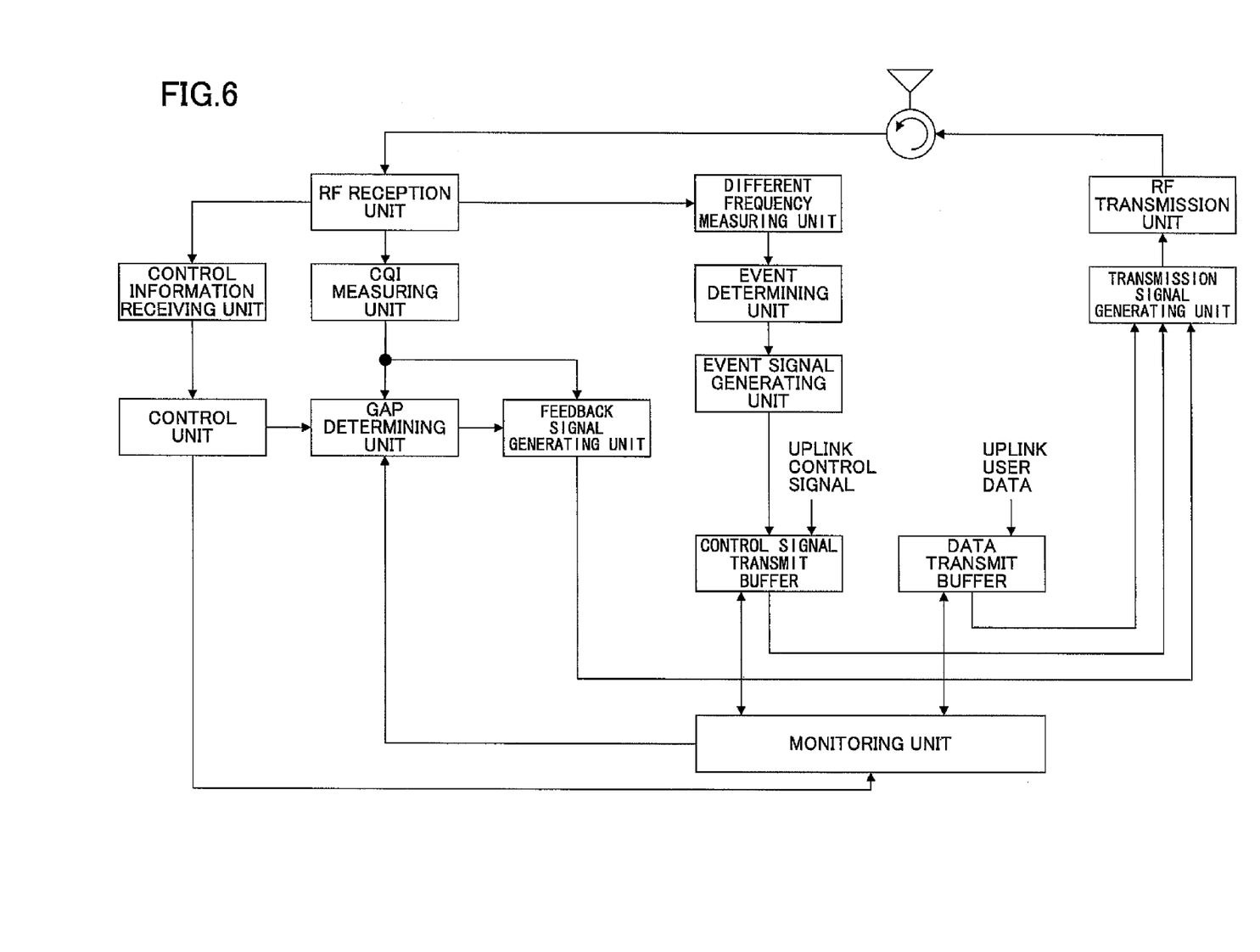
FIG. 6 is a block diagram illustrating a mobile station according to another embodiment of the present invention.

FIG. 6 shows a mobile station according to an embodiment of the present invention. The mobile station shown in FIG. 6 also includes functions described with reference to FIG. 3. Note that the difference between the block diagrams of FIGS. 3 and 6 is to clearly illustrate the difference between the first and second embodiments. Overlapping descriptions of components already described in the above embodiment are omitted. The mobile station of FIG. 6 includes a feedback signal generating unit, a control signal transmit buffer, a data transmit buffer, and a monitoring unit in addition to components already described with reference to FIG. 3.

The feedback signal generating unit generates a signal for reporting a CQI to the base station and a signal for reporting a gap. For example, if the gap determining unit has determined to create a gap, the feedback signal generating unit refrains from reporting a CQI or generates a separate signal for reporting the gap.

The control signal transmit buffer temporarily stores uplink control information.

The data transmit buffer temporarily stores uplink user data.

The monitoring unit monitors the amounts of retained data in the data transmit buffer and/or the control signal transmit buffer. The monitoring unit also evaluates the amounts of retained data based on conditions set by the control unit. For example, the monitoring unit compares the amounts of retained data (the amounts of data stored in the respective buffers and not transmitted yet) with a predetermined threshold(s) and thereby determines a data retention status. Either the same threshold or different thresholds may be used for the control signal and the user data. Also, the evaluation may be performed taking into account the urgency of data. For example, the data retention status may be determined based on the amount of urgent data. In any case, the monitoring unit determines whether an excessive amount of data are retained in buffers based on a given criterion, and sends the result to the gap determining unit.

The control unit sets monitoring conditions (monitoring interval, data urgency criteria, etc.) for the monitoring unit. The control unit also sets determination conditions (a criterion on CQI, a criterion on the amount of retained data reported by the monitoring unit, and so on) for the gap determining unit.

Control signals and user data to be transmitted to the base station are stored in the respective transmit buffers as needed. The monitoring unit determines whether an excessive amount of data are retained in the transmit buffers based on a given criterion, and sends the determination result to the gap determining unit. The gap determining unit determines to create a gap only when the instantaneous CQI is lower than a predetermined threshold (in the above example, a mean CQI) and the determination result from the monitoring unit indicates that the amount of retained data in the control signal transmit buffer and/or the data transit buffer is not excessive. Therefore, even when the instantaneous CQI is lower than the mean CQI, no gap is created if an excessive amount of data are retained in the control signal transmit buffer and/or the data transit buffer so that transmission of data in the transmit buffers are facilitated. Thus, this embodiment at least reduces the delay of uplink data transmission.

Third Embodiment

In many normal mobile stations, received user data are temporarily stored in a receive buffer for retransmission based on hybrid automatic repeat request (ARQ) or parallel stop-and-wait ARQ, or until the reception of a logical block (packet) interpretable by an upper layer protocol is completed. Also, there is a case where received user data are buffered to guarantee in-sequence delivery for an upper layer protocol. For an upper layer protocol, it is preferable that a meaningful logical block is received as quickly as possible. Also, retransmission data for hybrid ARQ are preferably received as quickly as possible in order to reduce delay. Accordingly, if gaps are created without taking into account the status of a receive buffer, downlink transmission characteristics may be degraded.

Figure 7:
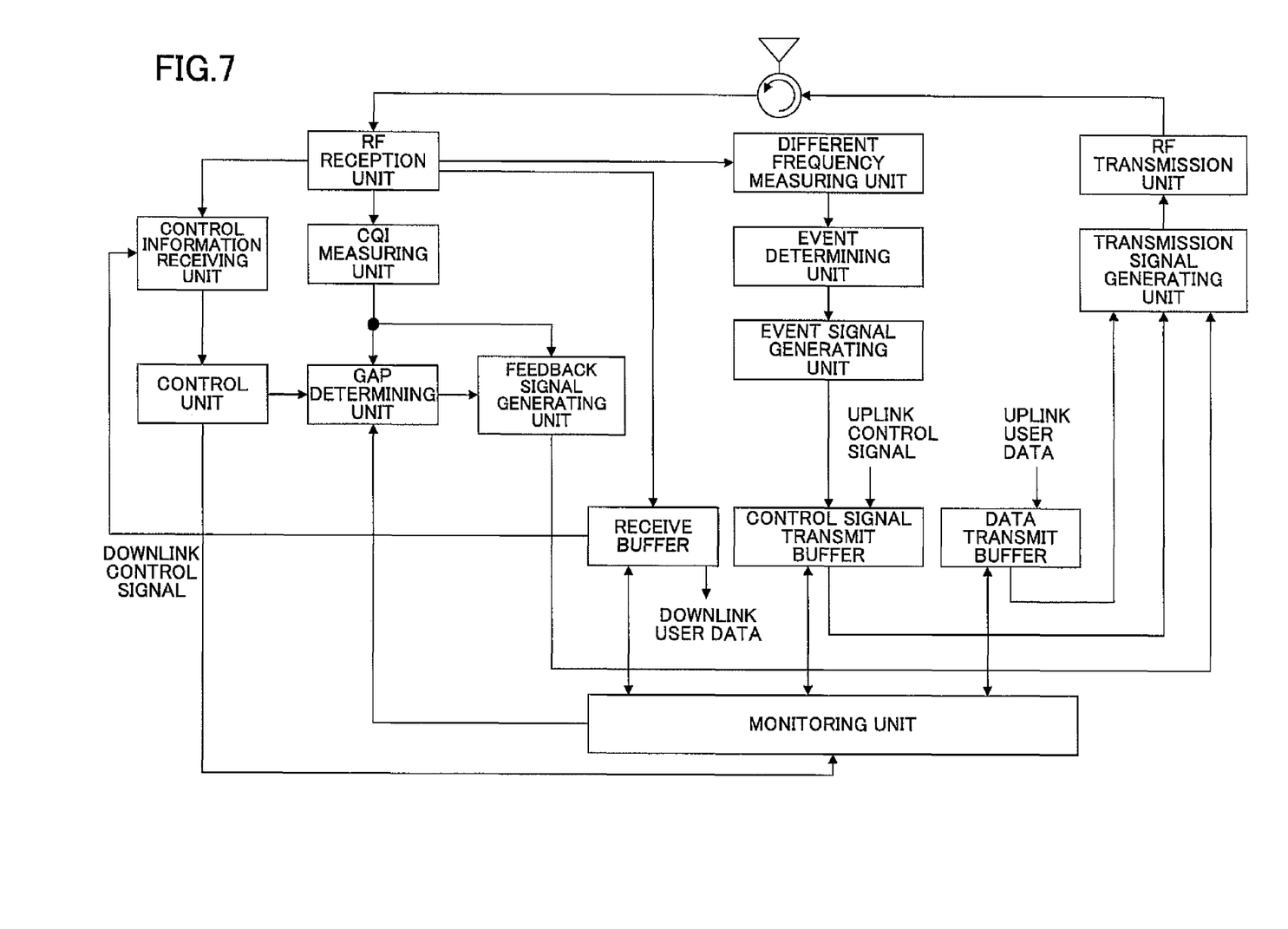
FIG. 7 is a block diagram illustrating a mobile station according to another embodiment of the present invention.

FIG. 7 shows a mobile station according to an embodiment of the present invention. Below, overlapping descriptions of components already described in the above embodiments are omitted. The mobile station of FIG. 7 includes a receive buffer in addition to components already described with reference to FIG. 6.

The receive buffer temporarily stores received data according to a method such as hybrid ARQ, parallel stop-and-wait ARQ, or in-sequence delivery used in the radio access system.

The monitoring unit includes a function to monitor the data buffering status of the receive buffer in addition to the function described in the second embodiment with reference to FIG. 6. The monitoring unit evaluates the buffering status based on conditions set by the control unit. For example, the monitoring unit determines whether there are data waiting for retransmission by hybrid ARQ, whether the number of retransmission wait times is greater than a threshold, and/or whether the retransmission wait time is greater than a threshold. The monitoring unit may also be configured to detect a case where the reception of data that must be passed later to an upper layer protocol to achieve in-sequence delivery is completed, but data (low-numbered data) to be passed earlier to the upper layer protocol are not received yet and therefore missing. Thus, the buffering status of the receive buffer may be evaluated based on the reception status of data in logical block units of the upper layer protocol or based on the retransmission wait status of hybrid ARQ. In any case, the monitoring unit determines the data buffering status based on a given criterion, and sends the determination result to the gap determining unit.

The gap determining unit determines whether to create a gap based on the buffering status of the receive buffer in addition to criteria as described in the second embodiment with reference to FIG. 6. For example, the gap determining unit determines not to create a gap if there are data waiting for retransmission by hybrid ARQ to facilitate the data transmission. Alternatively, the gap determining unit may be configured to determine not to create a gap if low-numbered data in in-sequence delivery are missing and thereby to facilitate the data transmission.

Meanwhile, the control signal receiving unit receives control signals from both the receive buffer and the RF reception unit. This is because there are roughly two types of control signals: a control signal that is buffered by the receive buffer until a meaningful logical block is received and is then sent to the control signal receiving unit; and a control signal that can be directly sent from the RF reception unit to the control signal receiving unit because it is transmitted at high speed without going through encoding. In practice, both types of control signals are not always used. However, such configurations are not directly relevant to the present invention.

The present invention is not limited to the specifically disclosed embodiments, and variations and modifications may be made without departing from the scope of the present invention. Although the present invention is described above in different embodiments, the distinctions between the embodiments are not essential for the present invention, and the embodiments may be used individually or in combination.

The present international application claims priority from Japanese Patent Application No. 2006-077824 filed on Mar. 20, 2006, the entire contents of which are hereby incorporated herein by reference.

The invention claimed is:

1. A mobile station designed to send or receive at least a control channel using a given frequency in a first operating mode and to tune to a frequency different from the given frequency and perform a neighboring cell search in a second operating mode, the mobile station comprising:
    a measuring unit configured to obtain a measurement of radio channel quality at a measurement interval;
    a determining unit configured to compare the measurement and a threshold and to select one of the first operating mode and the second operating mode based on the result of comparison; and
    a preventing unit configured to prevent reporting of the measurement to a base station if the measurement is lower than the threshold,
    wherein the operating mode is selected based on the status of a buffer for storing data if the measurement of radio channel quality is lower than the threshold;
    wherein the mobile station is configured to switch from a regular mode to an irregular mode if a mean value of instantaneous measurements of radio channel quality is lower than a first threshold; and
    wherein the mobile station is configured to switch from the irregular mode to the regular mode if the mean value of the instantaneous measurements of radio channel quality is higher than a second threshold.

2. The mobile station as claimed in claim 1, wherein an instantaneous measurement is normalized.

3. The mobile station as claimed in claim 1, wherein the threshold is a mean value of instantaneous measurements of radio channel quality, a fixed value that is temporally constant, or a value obtained by adding a temporally-constant correction value to the mean value of instantaneous measurements.

4. The mobile station as claimed in claim 3, wherein at least one of the fixed value and the correction value is sent from the base station.

5. The mobile station as claimed in claim 3, wherein the threshold is adjusted according to a service being provided in the first operating mode or the amount of traffic of the base station.

6. The mobile station as claimed in claim 3, wherein the threshold is adjusted according to at least one of transmission scheduling frequency, throughput, and a packet loss rate of the mobile station.

7. The mobile station as claimed in claim 1, wherein the mobile station is configured to operate in the regular mode or the irregular mode, to operate in the first operating mode in the regular mode, and to switch between the first operating mode and the second operating mode according to radio channel quality in the irregular mode.

8. The mobile station as claimed in claim 1, wherein the second threshold is higher than the first threshold.

9. The mobile station as claimed in claim 1, wherein the second operating mode is maintained for a predetermined period of time that is longer than the measurement interval.

10. The mobile station as claimed in claim 9, wherein the predetermined period of time is set by at least one of broadcast information and an individual control channel sent from the base station.

11. The mobile station as claimed in claim 1, wherein an upper limit is placed on the number of times measurements lower than the threshold are not reported in succession.

12. The mobile station as claimed in claim 11, wherein the upper limit is set by at least one of broadcast information and an individual control channel sent from the base station.

13. The mobile station as claimed in claim 11, wherein the upper limit is adjusted according to a service being provided.

14. The mobile station as claimed in claim 13, wherein when multiple services are being provided, the number of times measurements lower than the threshold are not reported in succession is kept within a lowest one of multiple upper limits.

15. The mobile station as claimed in claim 1, wherein
a system frequency band available for a mobile communication system is divided into a predetermined number of sub-bands;
the mobile station is configured to communicate using one or more of the sub-bands; and
measurements of radio channel quality are obtained for the respective sub-bands.

16. The mobile station as claimed in claim 15, wherein a value is derived from the measurements obtained for the respective sub-bands and the operating mode is selected based on the derived value.

17. The mobile station as claimed in claim 16, wherein the derived value is the largest value of the measurements or a mean value of the measurements.

18. The mobile station as claimed in claim 1, wherein the second operating mode is selected as the operating mode if the measurement of radio channel quality is lower than the threshold and the amount of unsent data in a transmit buffer is less than a predetermined value.

19. The mobile station as claimed in claim 1, wherein the second operating mode is selected as the operating mode if the measurement of radio channel quality is lower than the threshold and at least one of the following is true: the number of retransmission wait times of data in a receive buffer is less than a predetermined value, retransmission wait time of data in the receive buffer is less than a predetermined value, and reception of data by the receive buffer which data are necessary to guarantee communication sequence is completed.

20. A mobile station designed to send or receive at least a control channel using a given frequency in a first operating mode and to tune to a frequency different from the given frequency and perform a neighboring cell search in a second operating mode, the mobile station comprising:
a measuring unit configured to obtain a measurement of radio channel quality at a measurement interval;
a determining unit configured to compare the measurement and a threshold and to select one of the first operating mode and the second operating mode based on the result of comparison; and
a transmitting unit configured to transmit a signal indicating the selected operating mode to a base station,
wherein the operating mode is selected based on the status of a buffer for storing data if the measurement of radio channel quality is lower than the threshold;
wherein the mobile station is configured to switch from a regular mode to an irregular mode if a mean value of instantaneous measurements of radio channel quality is lower than a first threshold; and
wherein the mobile station is configured to switch from the irregular mode to the regular mode if the mean value of the instantaneous measurements of radio channel quality is higher than a second threshold.

21. The mobile station as claimed in claim 20, wherein an upper limit is placed on the number of times a signal indicating the second operating mode is transmitted successively to the base station.

22. A neighboring cell measuring method used in a mobile station designed to send or receive at least a control channel using a given frequency in a first operating mode and to tune to a frequency different from the given frequency and perform a neighboring cell search in a second operating mode, the method comprising the steps of:
obtaining a measurement of radio channel quality at a measurement interval; and
comparing the measurement and a threshold and selecting one of the first operating mode and the second operating mode based on the result of comparison;
wherein the mobile station includes a function to prevent reporting of the measurement to a base station if the measurement is lower than the threshold,
wherein the operating mode is selected based on the status of a buffer for storing data if the measurement of radio channel quality is lower than the threshold,
switching from a regular mode to an irregular mode if a mean value of instantaneous measurements of radio channel quality is lower than a first threshold; and
switching from the irregular mode to the regular mode if the mean value of the instantaneous measurements of radio channel quality is higher than a second threshold.

23. A neighboring cell measuring method used in a mobile station designed to send or receive at least a control channel using a given frequency in a first operating mode and to tune to a frequency different from the given frequency and perform a neighboring cell search in a second operating mode, the method comprising the steps of:
obtaining a measurement of radio channel quality at a measurement interval;
comparing the measurement and a threshold and selecting one of the first operating mode and the second operating mode based on the result of comparison;
transmitting a signal indicating the selected operating mode to a base station;
switching from a regular mode to an irregular mode if a mean value of instantaneous measurements of radio channel quality is lower than a first threshold; and
switching from the irregular mode to the regular mode if the mean value of the instantaneous measurements of radio channel quality is higher than a second threshold,
wherein the operating mode is selected based on the status of a buffer for storing data if the measurement of radio channel quality is lower than the threshold.

* * * * *